United States Patent

Dunham

[11] 3,722,266
[45] Mar. 27, 1973

[54] BRAKE BLEEDING TOOL
[76] Inventor: John C. Dunham, 227 Parker St., Cement City, Mich. 49233
[22] Filed: Jan. 3, 1972
[21] Appl. No.: 214,812

[52] U.S. Cl. ..............................73/132, 254/DIG. 5
[51] Int. Cl. .............................................G05g 21/00
[58] Field of Search..............73/132, 81; 254/DIG. 5

[56] References Cited

UNITED STATES PATENTS

| 1,681,192 | 8/1928 | McBride | 73/132 |
| 1,877,367 | 9/1932 | Seppman | 73/132 |
| 1,898,376 | 2/1933 | McCulloch et al. | 73/132 |
| 1,942,368 | 1/1934 | Wilkoff | 73/132 |

Primary Examiner—Charles A. Ruehl

[57] ABSTRACT

A tool for temporarily holding down an automobile brake pedal while mechanical installation or adjustment is being made by a mechanic, thus releasing the necessity of employing a second person for depressing the brake pedal with the foot; the device consisting of a spring loaded bar assembly which at one end rests against the brake pedal and which at its other end bears against the front of the driver's seat.

1 Claim, 3 Drawing Figures

3,722,266

BRAKE BLEEDING TOOL

This invention relates generally to automotive maintenance tools. More specifically, it relates to tools used in servicing automobile brakes.

It is generally well known that when an automobile mechanic is servicing a brake, such as during an installation or when making an adjustment, he sometimes requires the service of another person to sit in the car and depress the brake pedal. This situation is objectionable because it involves the need of a second worker who thus is not free for doing other productive work, and the situation is therefore in want of improvement.

Accordingly, it is a principal object of the present invention to provide a brake tool which replaces the necessity of employing an extra person's aid in depressing the brake pedal during an installation or adjustment.

Another object is to provide a brake tool which thus cuts on labor costs.

Yet another object is to provide a brake tool that is quick to use, and which saves valuable hours to the mechanic.

Other objects are to provide a brake tool which is simple in design, inexpensive to manufacture, rugged in construction, easy to use, and efficient in operation.

Figure 1:
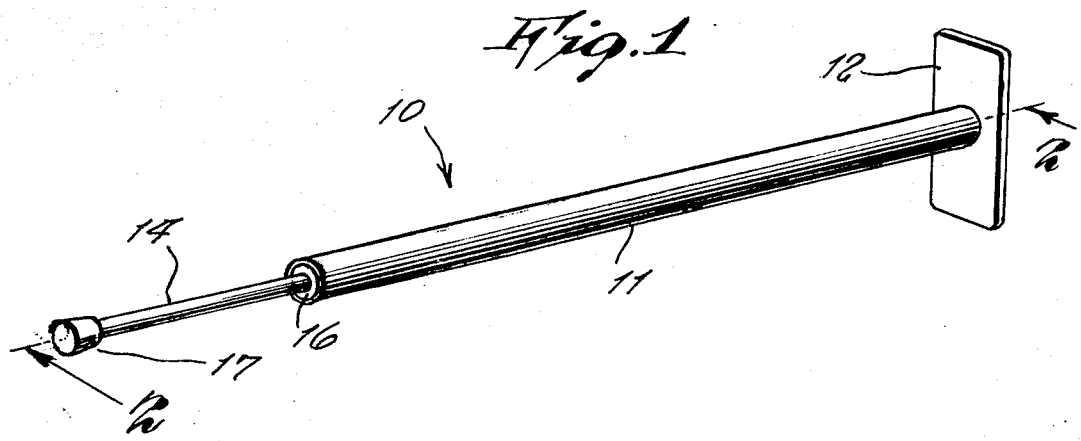
Figure 2:
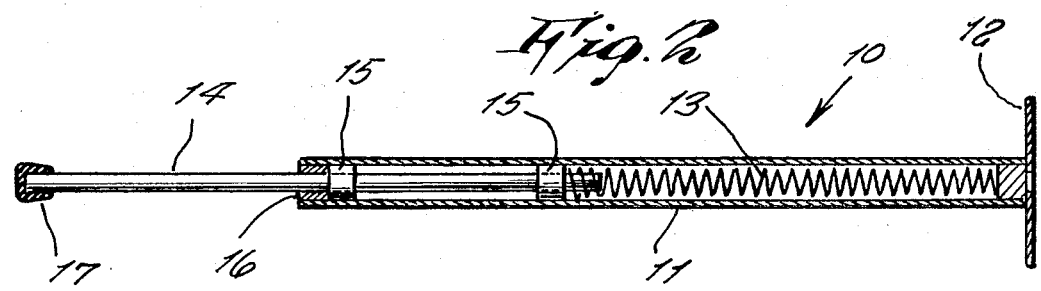
Figure 3:
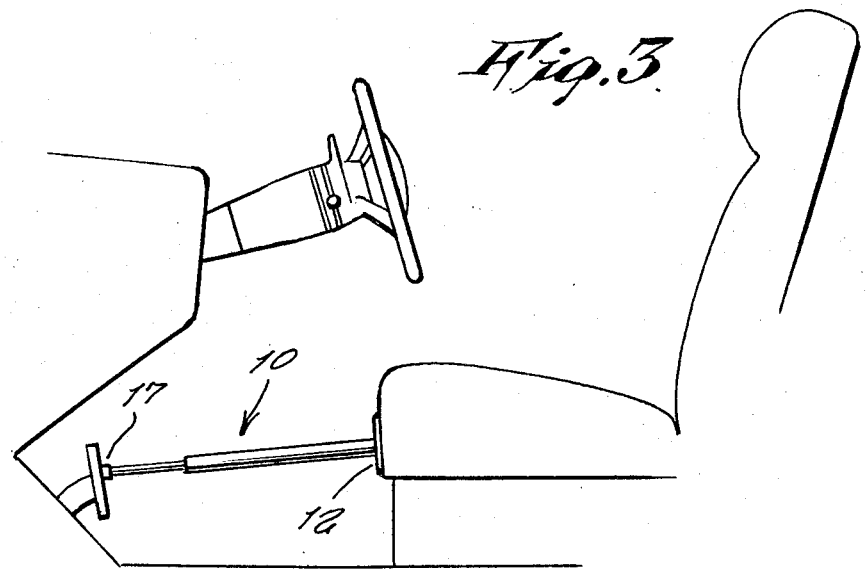

These and other objects will be readily apparent upon a study of the following specification and the accompanying drawing, wherein:

FIG. 1 is a perspective view of the invention.
FIG. 2 is a side cross-sectional view thereof.
FIG. 3 is a view showing the tool in operative use.

Referring now to the drawing in detail, the reference numeral 10 represents a brake tool according to the present invention, wherein there is a tubular member 11 made of ¾ inch electrical conduit material and which is 17 inches long.

A flat end plate 12 is integral with a block fitted in one end of the tubular member 11, the plate having a central opening therethrough.

A compression coil spring 13 is placed within the tubular member 11.

A solid metal bar 14 of 13 inches length is slidably fitted into the other end of member 11, the rod having a pair of spaced apart collars or bushings 15 welded thereupon and which frictionally slide on the inner face of the tubular member 11.

A stop collar 16 secured within the opening of this other end of member 11 is provided with an opening through which the bar 14 protrudes outwardly and which serves to prevent the bar from separating from the tubular member.

The outward end of the bar 14 is fitted with a rubber boot 17.

In operative use, as shown in FIG. 3, the plate 12 is positioned against the front side of the driver's seat, and the rod is pushed against the spring so to contract the tool sufficiently thus allowing the boot 17 to be fitted against the brake pedal, which is thus depressed due to the spring action.

While various changes may be made in the detail construction, it is understood that such changes will be within the spirit and scope of the present invention as is defined by the appended claims.

I claim:

1. In a brake tool, the combination of a bar assembly having means at one end to rest against a front side of a driver's seat, and means at its other end to bear against an automobile foot brake pedal, and means for maintaining said pedal in a depressed position, said assembly comprising a tubular housing member having a flat end plate secured on one end thereof, a compression coil spring within said tubular member, and a solid metal bar slidable outwardly of the other end of said tubular member, against the action of said spring, a stop collar in said other end of said tubular member preventing disengagement of said bar from said tubular member, said bar having a collar welded thereupon for abutment against said stop collar, and said bar having a second collar welded thereupon and against which said spring bears.

* * * * *